(12) United States Patent
Axel

(10) Patent No.: US 6,394,040 B1
(45) Date of Patent: May 28, 2002

(54) LIGHTED PET SAFETY COLLAR

(76) Inventor: Wendy Axel, 1442 A Walnut St., Berkeley, CA (US) 94709

( * ) Notice: Subject to any disclaimer, the term of this patent is extended or adjusted under 35 U.S.C. 154(b) by 0 days.

(21) Appl. No.: 09/584,941

(22) Filed: Jun. 1, 2000

(51) Int. Cl.[7] .............................................. A62B 35/00
(52) U.S. Cl. ...................................................... 119/859
(58) Field of Search ................................ 119/858, 859; 362/103, 108; D26/37, 39

(56) References Cited

U.S. PATENT DOCUMENTS

| | | | | |
|---|---|---|---|---|
| 3,871,336 A | * | 3/1975 | Bergman | 119/858 |
| 4,887,552 A | * | 12/1989 | Hayden | 119/859 |
| 5,967,095 A | * | 10/1999 | Greves | 119/859 |
| 6,055,942 A | * | 5/2000 | Romanak et al. | 119/859 |

* cited by examiner

Primary Examiner—Charles T. Jordan
Assistant Examiner—Elizabeth Shaw
(74) Attorney, Agent, or Firm—Amster, Rothstein & Ebenstein

(57) ABSTRACT

A lighted safety collar for pets includes an elongate strap and a plurality of light emitting units slidably attached to the strap. Each of the light emitting units includes a housing with a base and a lens formed of a rigid, translucent material. A light control circuit is provided having a battery, a low-power light source, and a switch for selectively operating the light source. A reflector provided within the housing enhances light output and reflects incoming light. Slidable attachment to the elongate strap is provided by a slider box attached to the housing that permits repositioning of the lights relative to the strap.

8 Claims, 3 Drawing Sheets

LIGHTED PET SAFETY COLLAR

FIELD OF THE INVENTION

This invention relates to specialty lighting and, more particularly to a lamp securable to a pet collar to increase the visibility of the pet at night or in low lighting conditions.

BACKGROUND OF THE INVENTION

It is well known in the prior art to attach devices such as reflectors and lights to pets to make them more visible in the dark, for the convenience of the owner as well as for the safety of the pet. For example U.S. Pat. No. 4,875,145 to Roberts ("the Roberts '145 Patent") discloses a light apparatus fastened to a pet's collar having a battery, connected to an electric lamp and a switch. The disclosed configuration of the Roberts '145 Patent permits the device to move freely on the collar, tending toward an orientation favored by gravity. A contrasting approach is taken in U.S. Pat. No. 5,535,106 to Tangen ("the Tangen '106 Patent") wherein a plurality of self-contained light emitting devices are spaced at intervals and affixed to the collar by a fastener.

Although devices of this kind provide concerned pet owners with an added margin of safety when used, their current configurations have several shortcomings. Light emitting elements that are bright enough to be useful tend to be large to allow room for adequate batteries. Those that are lighter and smaller are more likely to be obscured by fur and are either relatively dim or drain their power sources quickly. Additionally, the current designs are not suited to be worn in rainy weather or when a pet is swimming. As a result, current lighted collar designs are not adapted to be worn continuously or comfortably by the pets they are designed to protect. It is therefore likely that an owner will overlook or misplace the collar when it is needed.

Accordingly there is a need for a lighted collar for pets that is sufficiently visible, weather resistant, comfortable for extended wear by the pet and is not obscured by fur.

SUMMARY OF THE INVENTION

The present invention is directed to light emitting units for mounting on a collar for pets, especially dogs, cats and horses. The light emitting units have a housing with a base and a lens. The base is an open-ended container having within it the power source, control circuitry including an electric switch and one or more electric light sources, preferably light emitting diodes (LEDs). Attached to the outside of the base is a slider box for slidable and secure attachment to a pet collar. The lens is translucent and is adapted to be attached to the base to form an enclosed housing.

In a preferred embodiment of the light emitting unit, a circuit board is mounted inside the base. LEDs are electrically connected the circuit board which connects them to a control circuit having a switch and a battery. Given the low power requirements of an LED, two small "watch batteries" can provide adequate power for three LEDs. The resulting circuit is compact, consumes relatively little power and has a relatively high light output. The lens is made of translucent material, such as plastic, and is designed to snap onto the base, enclosing the circuit components within the base. A switch hole is disposed through the lens to permit an actuator, such as a small plastic actuator pin, to pass into the housing and to be held in place to engage the switch, turning the circuit on and off.

In another preferred embodiment the light emitting unit is made watertight by introducing a rubber gasket such as an o-ring between the lens and the base so that the seal formed therebetween is watertight. In accordance with this embodiment, the switch hole may also be rendered watertight.

One possible approach is to mount the actuator pin in a flexible rubber-like cap pressed into a watertight engagement with the switch hole. The pin moves slightly as pressure is applied to the cap, said movement being transmitted to the switch via the actuator pin. The switch on the circuit board is preferably a momentary contact or "membrane-type" switch that requires very little movement to actuate, and the control circuit is therefore preferably designed to switch to an on or off state in response to this momentary input. Other approaches, however, may be employed that provide similar functionality while retaining a watertight character.

In a further embodiment, a friction strip is attached onto the base near the slider box to increase the sliding friction of the light emitting unit relative to the collar. The friction strip prevents the light emitting unit from sliding along the collar on its own due to the movement of the pet, and the force of gravity. This is especially necessary in cases where multiple light emitting units are used on a single collar, to ensure that the spacing of the units remains fixed relative to each other. By preventing the light emitting units from "bunching up" or moving to the same place on the collar, it is more likely that at least one light emitting unit will be in a location on the collar where it can be seen. Permitting secure reorientation by the pet owner allows the light emitting units to be distributed optimally on the collar.

In a further embodiment, a reflector plate is added within the housing of the light emitting unit behind the electric light sources to reflect more of the light generated by the unit through the lens. The reflector provides the additional advantage of reflecting any light that is directed into the light emitting unit, such as that from automobile headlights, back out where it can be seen. In this way, the reflector can be used in combination with more efficient lighting to conserve battery life, and in the case of a dead battery, malfunctioning unit, or in case the unit is turned off, ensure that some measure of visibility is preserved.

In still another embodiment, parallel grooves are disposed in the lens to scatter light passing out of the light emitting unit to increase visibility from all angles of view. Parallel grooves may be disposed in the reflector as well, for example in a direction perpendicular to the grooves disposed in the lens to further enhance the scattering of the light from the unit.

In still another embodiment, the light emitting units are attached to a collar having a means for attaching a lead. According to this embodiment, the collar may itself be made of reflective material to further enhance the visibility of the wearer. Furthermore, light emitting units can be disposed on the lead.

DESCRIPTION OF THE PREFERRED EMBODIMENTS

Figure 1:
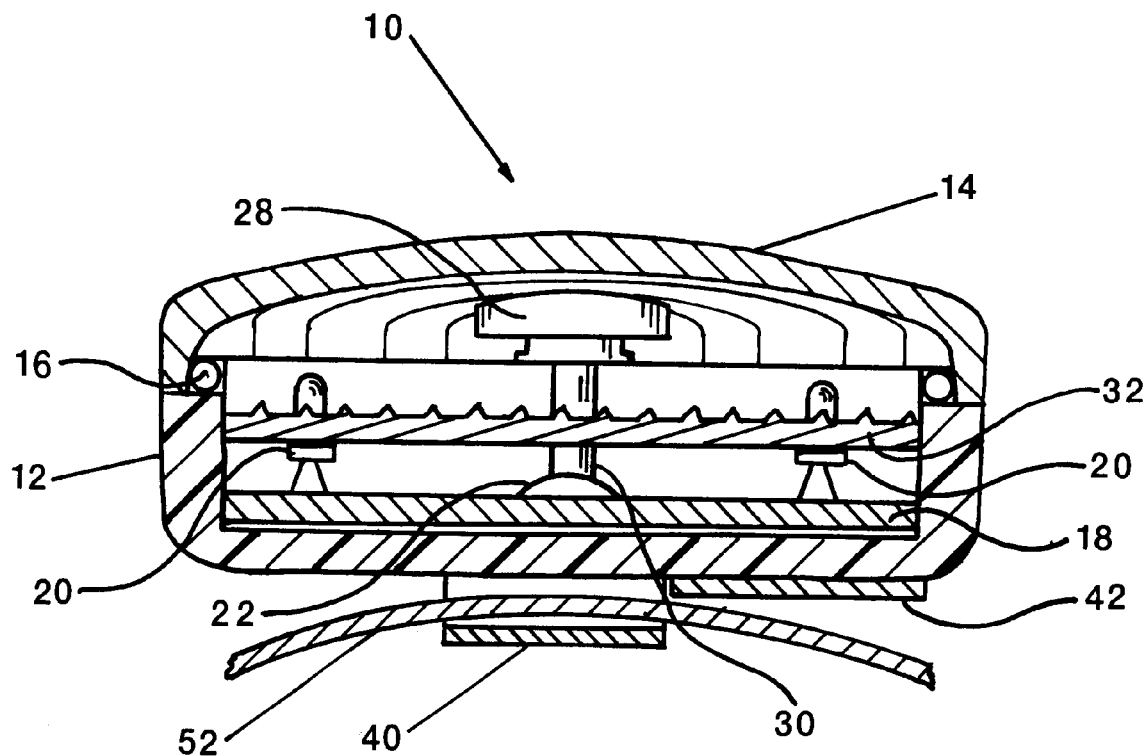
FIG. 1 is a section view of the assembled light emitting unit.

Referring now to FIG. 1, an exploded view of the light emitting unit of the present invention which has base 12 and lens 14 adapted for mating attachment to base 12 with o-ring 16 disposed therebetween to provide a watertight seal. Provided within base 12 is circuit board 18 having mounted thereon lighting means 20 and switch means 22 electrically connected together through circuit control and battery means (not shown). Lens 14 is made of rigid translucent material and has provided therein watertight switch cap 28 made of a flexible rubber-like material that permits movement of actuator pin 30 mounted within switch cap 28. Reflector 32 is adapted to fit within base 12 and behind lighting means 20. The surface of reflector 32 is highly reflective and acts to reflect light out of the light emitting unit 10 through lens 14.

Actuator pin 30 rests against switch 22. Through the application of pressure to the surface of switch cap 28, actuator pin 30 is slightly depressed, engaging switch 22. As mentioned above, a membrane switch is suitable for operation as switch 22 in the configuration described herein.

A slider box 40 is provided on base 12 permitting the assembled light emitting unit to be slidably mounted to an animal collar 52. Friction strip 42 is provided along the path of the collar to prevent the light emitting unit from inadvertently sliding to another orientation relative to the collar. In combination slider box 40 and friction strip 42 permit the pet owner to select an arrangement of light emitting units that minimizes obstruction such as by fur.

Figure 2:
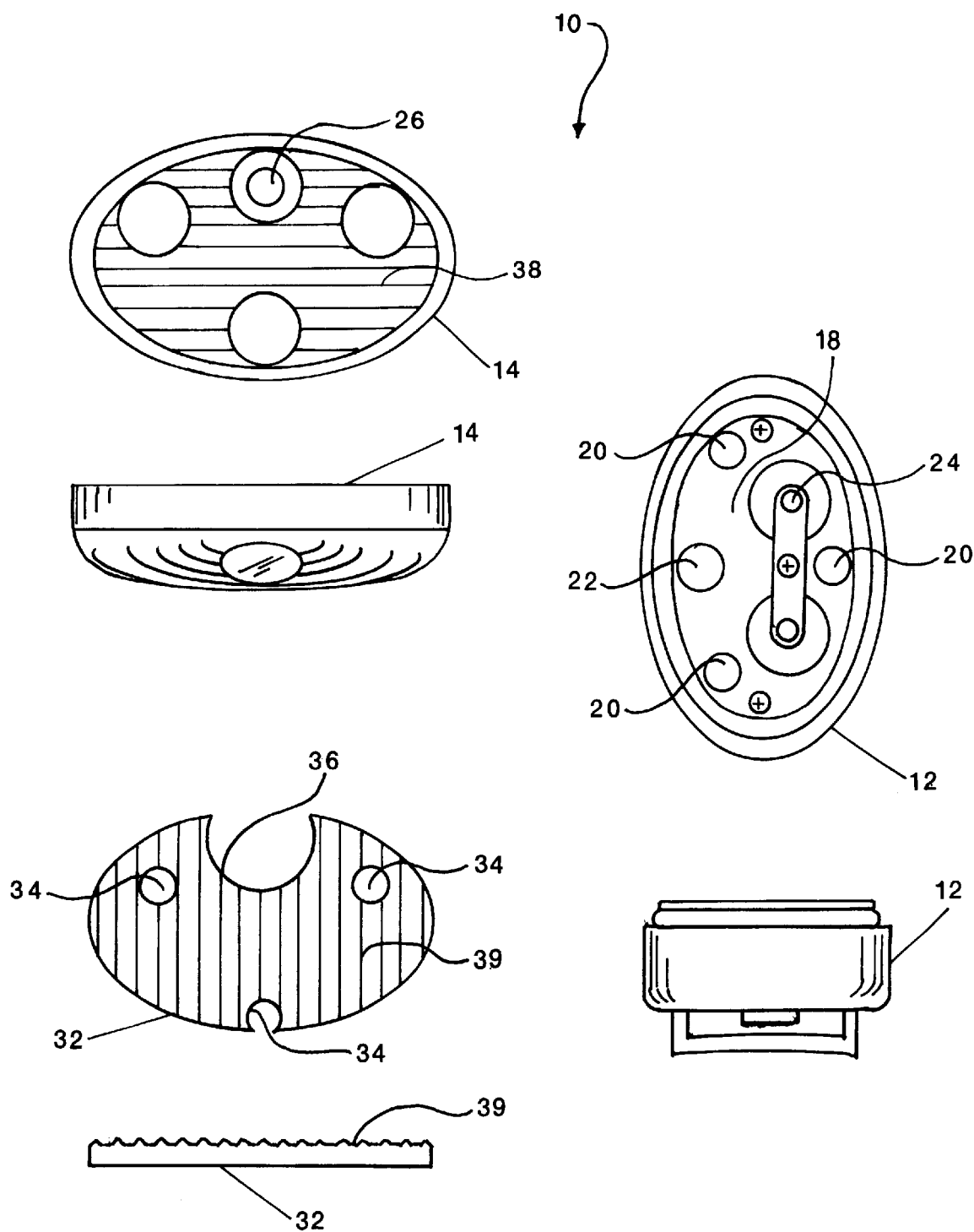
FIG. 2 is an exploded view of the light emitting unit.

Referring now to FIG. 2, showing the embodiment of light emitting unit of FIG. 1 in greater detail. Circuit board 18 is shown within base 12 having lighting means 20, switch means 22 and battery means 24. Lens 14 has switch hole 26 adapted to provide a watertight seal with a switch cap and aligned with switch means 22. Reflector 32 is shown having holes 34 aligned to admit lighting means 20, and opening 36 to provide access through reflector 32 to switch 22 from switch hole 26. Parallel grooves 38 disposed on lens 14 and grooves 39 on reflector 32 disposed perpendicularly to lens 14 on reflector 32 act in combination to enhance light scattering, making the light emitting unit 10 more visible from different viewing angles. Battery means 24 is shown as two small cylindrical "watch batteries" disposed within or on the surface of circuit board 18 and configured for easy removal and replacement.

Figure 3:
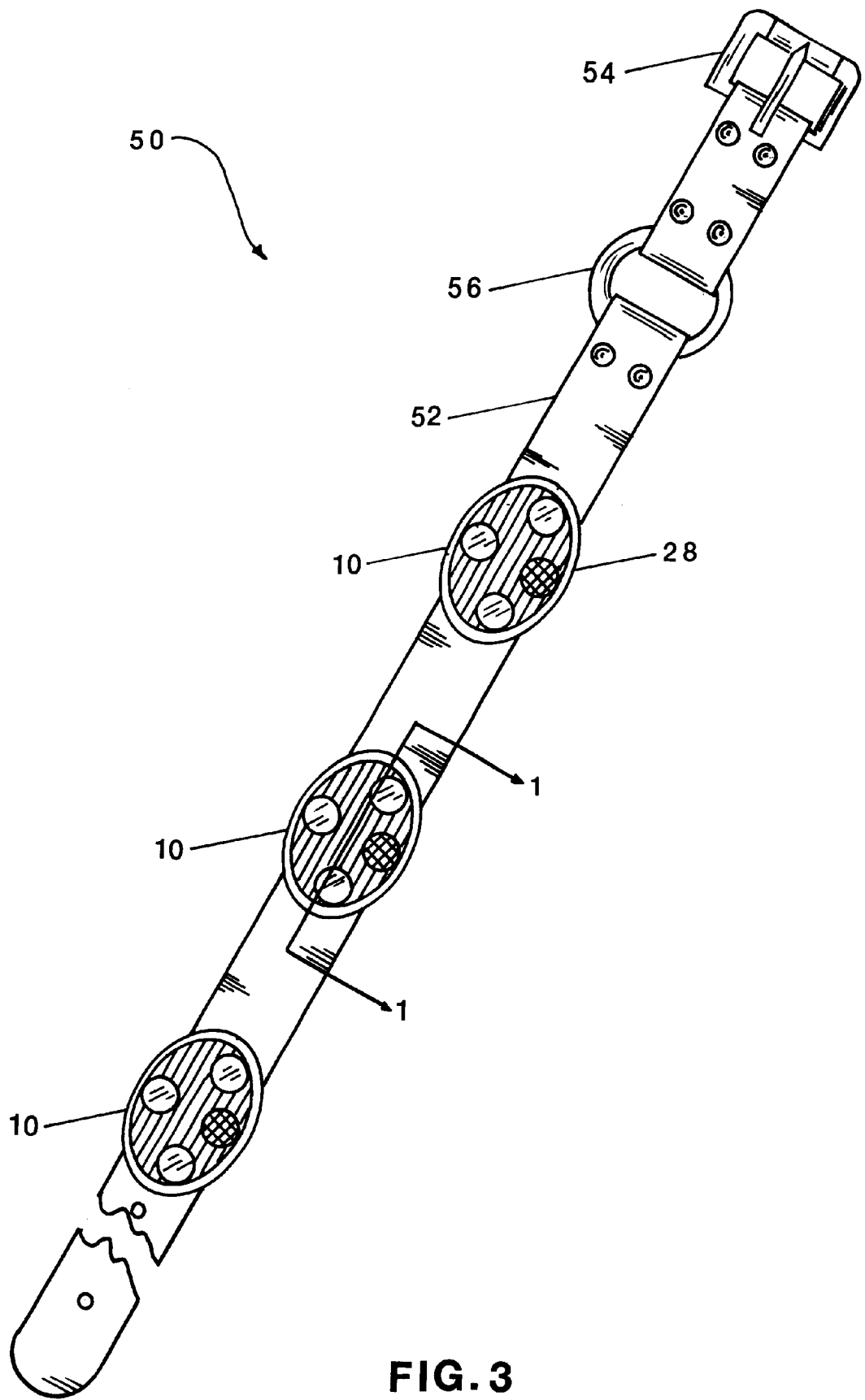
FIG. 3 is a perspective view of the lighted pet safety collar of the present invention.

Referring now to FIG. 3, a perspective view showing the lighted pet safety collar 50 of the present invention having a plurality of light emitting units 10 slidably mounted on an elongate strap 52 suitable for attachment around a pet. Elongate strap 52 is made of a flexible material such as woven or plastic-coated nylon, and has a connection means 54 so that the elongate strap 52 may form a loop. Elongate strap 52 may also be made of reflective material. Ring 56 may be connected to elongate strap 52 to permit connection of a leash (not shown) to the pet safety collar 50. In the case wherein a leash is connected to ring 56, the leash may also have light emitting units 10 mounted thereon.

While the invention has been shown and described in what is considered to be a practical and preferred embodiment, it is recognized that departures may be made within the spirit and scope of the following claims, which, therefore, should not be limited except within the Doctrine of Equivalents.

What is claimed is:

1. A light emitting unit for attachment to a pet collar comprising:

a housing having a base and a detachable translucent lens, said lens having a hole disposed therein;

a light control circuit within said housing having a battery means, switch means and at least one electric light source;

a switch actuation means disposed in said lens through said hole disposed therein and in operable engagement with said switch means;

a slider box attached to said housing to receive a pet collar for slidable attachment thereto; and a friction strip mounted on said base proximal to said slider box to engage said pet collar to retard sliding of said light emitting unit relative thereto.

2. The light emitting unit of claim 1 wherein light is selectively produced by said light control circuit dependent upon said switch actuation means and is transmitted outside said housing through said lens.

3. The light emitting unit of claim 1 wherein said switch actuating means forms a watertight seal with said hole disposed in said lens.

4. The light emitting unit of claim 3 wherein said switch actuating means comprises a flexible switch cap and an actuating pin connected to said switch cap and in operable engagement with said switch means.

5. The light emitting unit of claim 1 wherein said lens and said base form a watertight seal when attached.

6. The light emitting unit of claim 5 further comprising an o-ring disposed between said lens and said base providing said watertight seal therebetween.

7. A light emitting unit for attachment to a pet collar comprising:

a housing having a base and a detachable translucent lens, said lens having a hole disposed therein;

a light control circuit within said housing having a battery means, switch means and at least one electric light source;

a switch actuation means disposed in said lens through said hole disposed therein and in operable engagement with said switch means;

a slider box attached to said housing to receive a pet collar for slidable attachment thereto;

a reflector means within said housing oriented to direct light through said lens, said lens having parallel grooves disposed therein to scatter light passing therethrough; and parallel grooves in said reflector parallel to said grooves in said lens to enhance scattering reflected light through the lens.

8. A light emitting unit for attachment to a pet collar comprising:

a housing having a base and a detachable translucent lens, said lens having a hole disposed therein;

a light control circuit within said housing having a battery means, switch means and at least one electric light source;

a switch actuation means disposed in said lens through said hole disposed therein and in operable engagement with said switch means;

a slider box attached to said housing to receive a pet collar for slidable attachment thereto;

a reflector within said housing having parallel grooves disposed thereon oriented to direct light through said lens, said lens having grooves disposed therein perpendicular to the grooves on said reflector to scatter light passing therethrough.

* * * * *